United States Patent [19]

Martinez

[11] Patent Number: 4,908,600

[45] Date of Patent: Mar. 13, 1990

[54] NARROW BAND SYNCHRONIZED RADIO COMMUNICATION AND ALARM SYSTEM

[75] Inventor: Louis Martinez, Cerritos, Calif.

[73] Assignee: Cooper Industries, Inc., Houston, Tex.

[21] Appl. No.: 179,660

[22] Filed: Apr. 11, 1988

[51] Int. Cl.[4] .......... H04M 11/04

[52] U.S. Cl. .......... 340/310 R; 375/37; 455/75

[58] Field of Search .......... 375/37, 107; 455/31, 455/75; 331/21; 340/311.1, 310 R, 310 A, 310 C, 310 P, 825.14, 825.2

[56] References Cited

U.S. PATENT DOCUMENTS

| | | | |
|---|---|---|---|
| 3,448,402 | 6/1969 | Booker, Jr. et al. | 331/21 |
| 4,163,951 | 8/1975 | Aihara et al. | 331/1 A |
| 4,208,630 | 6/1980 | Martinez | 455/75 |
| 4,556,866 | 12/1985 | Gorecki | 375/45 |

*Primary Examiner*—Benedict V. Safourek
*Assistant Examiner*—T. Salindong
*Attorney, Agent, or Firm*—Blakely, Sokoloff, Taylor & Zafman

[57] ABSTRACT

A narrow band relatively ultra stable radio apparatus for communicating alarm or data signals from a radio transmitter device to a radio receiver device, which receiver or transmitter may be carried by individuals, or may be battery operated or fixed to other devices, such as smoke detectors or burglary sensors, or the like, wherein the transmitting device and the receiving device are both phase locked to a 60 Hertz power line signal either by direct connection or via a 60 Hertz voltage induced into said radio devices from nearby power lines to thereby provide a means to precisely synchronize the transmitting device radio carrier signal and/or digital clock stream with the receiving device to achieve very high signal transmission reliability is disclosed. The apparatus is capable of transmitting an alarm digital identification code or a digital message and the receiving devices may output a simple on-off signal indicating the presence of an alarm, or a digital message may be output to control an apparatus attached to said receiver. A novel timing oscillator synchronized to the household AC power line frequency via wireless induced voltage for real time synchronization of both the transmitter and the receiver is also disclosed.

19 Claims, 3 Drawing Sheets

NARROW BAND SYNCHRONIZED RADIO COMMUNICATION AND ALARM SYSTEM

BACKGROUND OF THE INVENTION

1. FIELD OF THE INVENTION

This invention relates to a narrow band, relatively ultra stable radio apparatus for communicating alarm or data signals from a transmitter to a remotely located receiver, which receiver or transmitter may be carried on the person of individuals or which may be fixed to other devices with which they cooperate, such as smoke detectors, burglary sensors or paging devices, especially when the transmitter or receiver devices are battery operated and located within the same building.

2. PRIOR ART

The transmission of alarm or paging signals to alert individuals to the presence of fire, burglary or for other purposes comprises a segment of the communication art wherein brief messages must be communicated with high reliability. Radio systems in the prior art usually rely on subcarrier audio tones for coding purposes, and to achieve improved signal-to-noise ratios. These subcarrier tones modulate a radio frequency carrier, resulting in relatively wide band width radio signal transmission. For example, a multiplicity of subcarrier tones spaced over a few hundred cycles in separation are often used by prior art alarm devices to provide user code identification means; i.e., different paging receivers will respond to different combinations of these subcarrier tones. This ensemble of various combinations of subcarrier tones may encompass a wide radio frequency bandwidth of several thousand Hertz or more. Such a wide radio bandwidth may admit a substantial amount of interference from either intentional or unintentional signals and noise that may be on the same radio channel, or spurious signals spilling over from nearby channels. These interfering signals significantly reduce the desired signal-to-noise ratio when compared to the signal-to-noise ratio attainable in the instant invention. In the present invention the radio bandwidth is constrained to approximately 100 Hz or less, and in addition, the digital data stream logic pulses are also synchronized a priori in the transmitter and the receiver, and this provides a substantial improvement in system reliability.

With respect to prior patents, narrow band communication techniques are described in my earlier patents, such as U.S. Pat. Nos. 4,117,405, 4,208,630 and 4,415,771.

BRIEF SUMMARY OF THE INVENTION

A narrow band relatively ultra stable radio apparatus for communicating alarm or data signals from a radio transmitter device to a radio receiver device, which receiver or transmitter may be carried by individuals, or may be battery operated or fixed to other devices, such as smoke detectors or burglary sensors, or the like, wherein the transmitting device and the receiving device are both phase locked to a 60 Hertz power line signal either by direct connection or via a 60 Hertz voltage induced into said radio devices from nearby power lines to thereby provide a means to precisely synchronize the transmitting device radio carrier signal and/or digital clock stream with the receiving device to achieve very high signal transmission reliability is disclosed. The apparatus is capable of transmitting an alarm digital identification code or a digital message and the receiving devices may output a simple on-off signal indicating the presence of an alarm, or a digital message may be output to control an apparatus attached to said receiver. A novel timing oscillator synchronized to the household AC power line frequency via wireless induced voltage for real time synchronization of both the transmitter and the receiver is also disclosed.

DETAILED DESCRIPTION OF THE INVENTION

Figure 1:
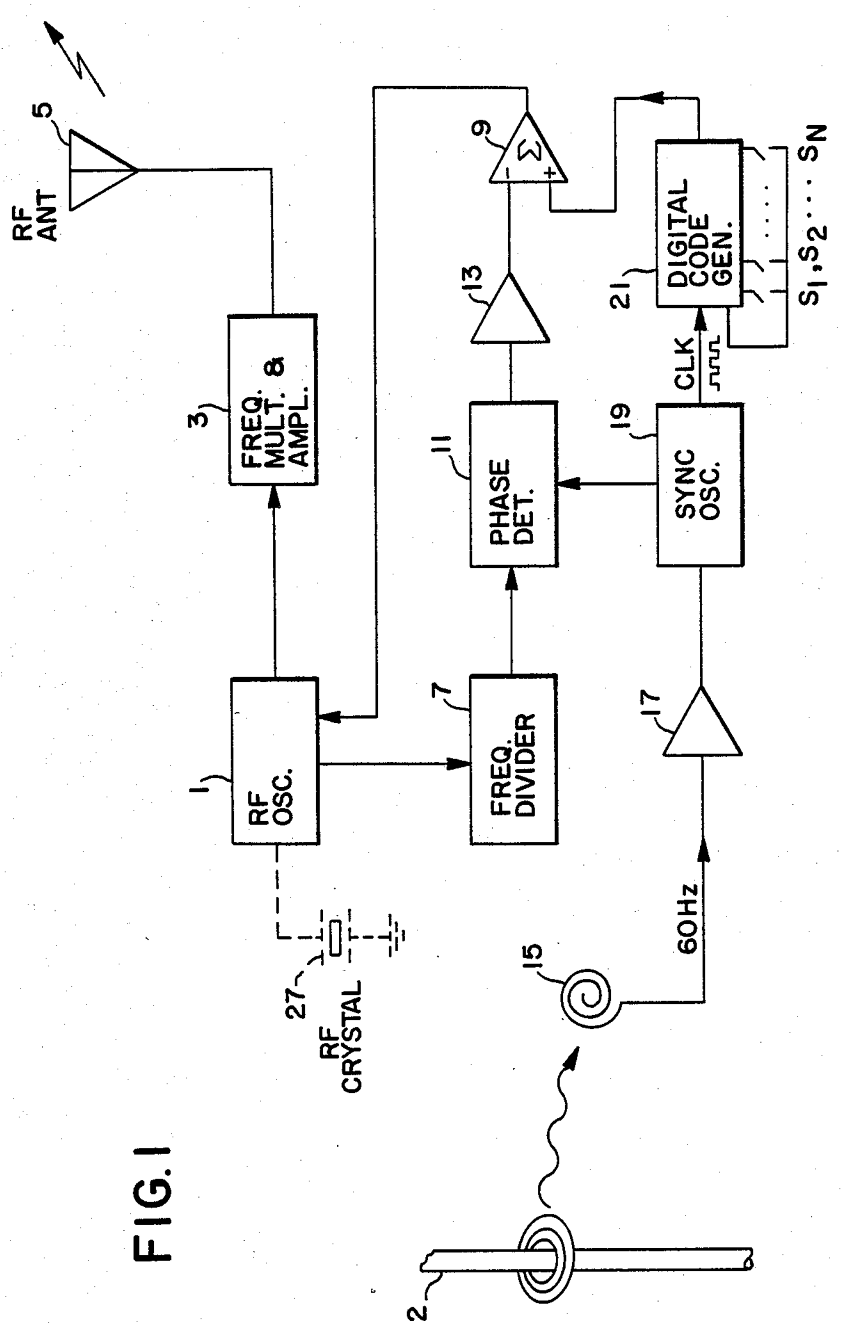
FIG. 1 is an overall simplified block diagram of the narrow band digital alarm transmitter in accordance with the present invention.

FIG. 1 graphically portrays a narrow band digital alarm transmitter according to the present invention wherein AC power line 2 represents a typical building AC power line which induces 60 Hz current into inductance antenna 15 and provides the basic timing for the alarm transmitter, which transmitter may be battery operated without direct connection to the power line. Radio frequency oscillator 1 generates the transmitter radio frequency which is amplified and multiplied in 3 and transmitted via antenna 5 which radiates this signal to a centrally located alarm receiver.

RF oscillator 1 may be crystal controlled by crystal 27, or alternatively may be a voltage control LC oscillator of conventional design. The 60 Hz signal induced from the household power line via antenna 15 is used to synchronize oscillator 19 which generates the basic digital clock frequency for timing digital code generator 21, and for stabilizing oscillator 1 as follows. A submultiple of the output frequency of RF oscillator 1 is taken from divider 7 and compared in phase comparator 11 with the output of sync oscillator 19; any difference in frequency between the divided frequency of RF oscillator 1 and the output of sync oscillator 19 is used to generate an error signal that is fed back to RF oscillator 1 via summing amplifier 9 to correct its frequency and bring it into synchronism with sync oscillator 19 whose basic timing is provided by the 60 Hz signal induced from the household power line. This is a conventional phase lock loop (PLL) arrangement. Digital code generator 21 develops a specific digital output pulse sequence in accordance with a preselected code combination, which code combination may be altered by selectively closing switches $S_1$, $S_2$. . . $S_n$.

Figure 4:
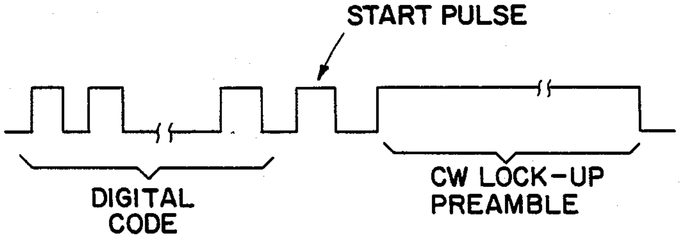
FIG. 4 illustrates the alarm transmitter preamble and code format.

The output signal frequency of the narrow band digital alarm transmitter of FIG. 1 is frequency shift keyed (FSK), consequently the frequency of oscillator 1 is shifted momentarily above or below the median frequency of the alarm transmitter in accordance with the digital pattern generated by digital code generator 21. A typical output digital FSK signal might comprise a radio frequency carrier median frequency of 40.665 MHz, which signal is shifted upward plus 100 Hz for a digital logic 1 pulse, or downward 100 Hz for a digital logic zero pulse. Thus the alarm transmitter radiates a form of frequency modulated digital signal where the radio frequency and the digital clock of the alarm transmitter are kept in synchronism with the 60 Hz signal induced from the AC household current. FIG. 4 illustrates a typical transmitter format.

Figure 2:
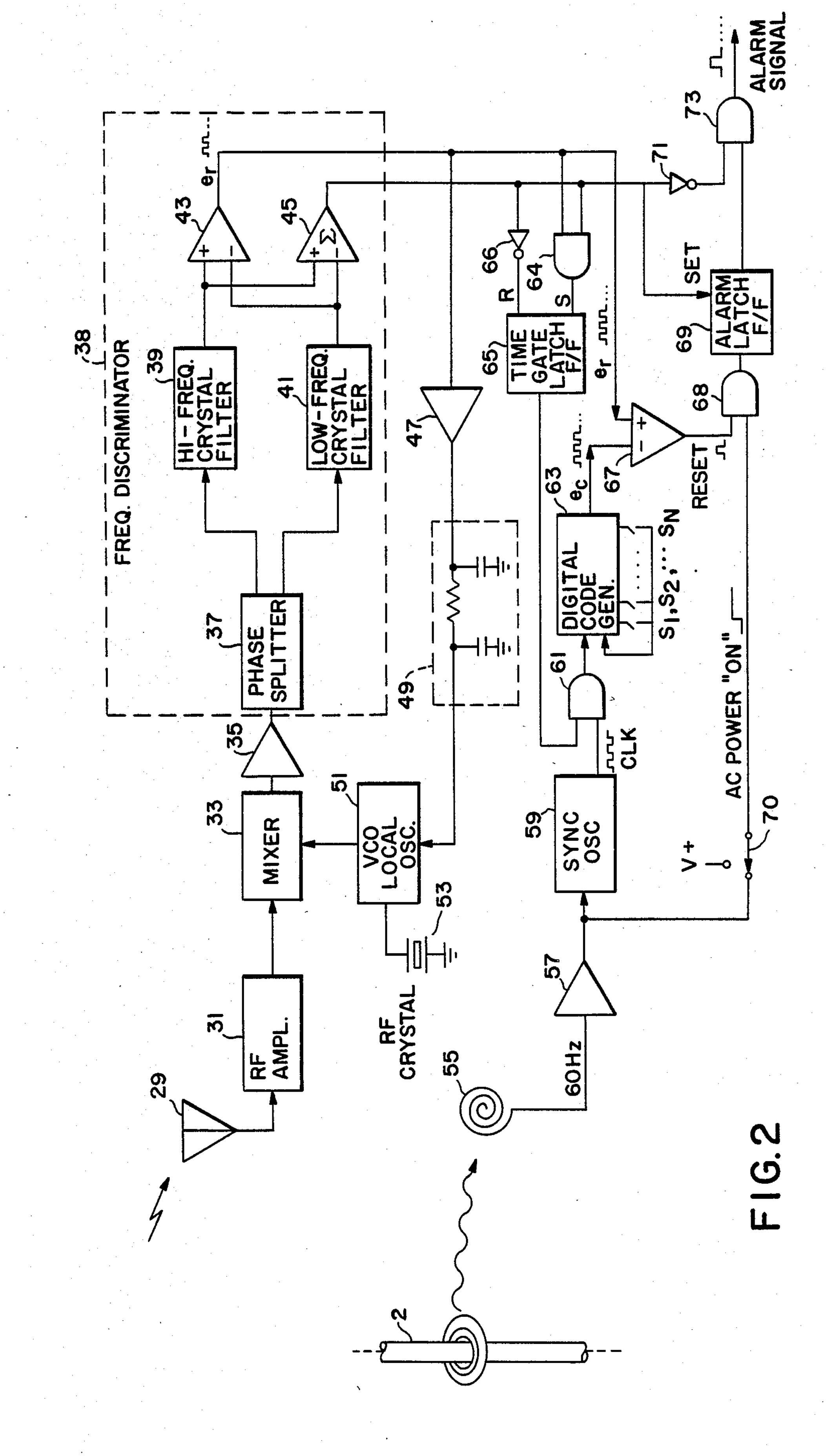
FIG. 2 illustrates a narrow band receiver which works in cooperation with the transmitter of FIG. 1.
Figure 3:
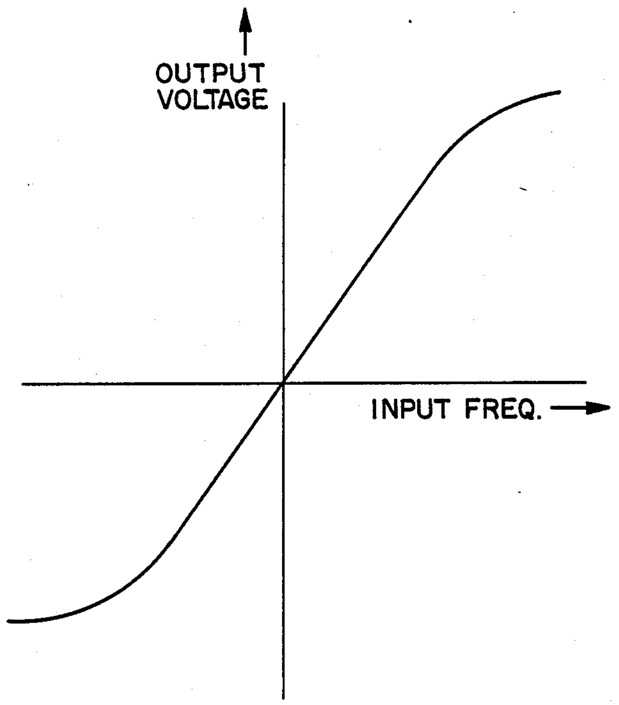
FIG. 3 is an illustration of the frequency discriminator used in the receiver of FIG. 2.

FIG. 2 illustrates a narrow band digital alarm receiver which detects signals from the transmitter shown in FIG. 1. A 60 Hz inductance antenna 55 detects the 60 Hz signal from a local household AC power line and amplifies this signal in amplifier 57 which then synchronizes oscillator 59 to bring it into coherence with the 60 Hz signal flowing in the household power line and thus into coherence with the companion remote transmitter. RF antenna 29 detects signals transmitted by the narrow band digital alarm transmitter shown in FIG. 1, amplifies them in 31, and mixes this detected radio signal with the output of oscillator 51 in mixer 33. The heterodyne intermediate frequency output from mixer 33 is amplified by 35 and provided as an output to phase splitter 37. Phase splitter 37 has two outputs 180 degrees out of phase from each other. One output of phase splitter 37 is sent to high frequency crystal filter 39 and the compliment signal is sent to low frequency crystal filter 41. The output of high frequency crystal filter 39 and low frequency crystal filter 41 are fed to difference amplifier 43. The action of phase splitter 37, crystal filters 39 and 41, and amplifier 43 is a sharply tuned equivalent of the action of conventional frequency discriminators in FM radio receivers wherein an output voltage (i.e. from amplifier 43) is generated which is proportional to the deviation of the incoming radio frequency from a prescribed center frequency. This is illustrated in FIG. 3. Also, one function of frequency discriminator 38 is to measure the incoming median frequency transmitted by the alarm transmitter and provide a control voltage to fine tune local oscillator 51 via smoothing filter 49 and thus insure that the heterodyne frequency going into phase splitter 37 is at a frequency midway between the center frequency of high frequency crystal filter 39 and low crystal filter 41. This automatic frequency control (AFC) action is maintained throughout the alarm transmission. The second function of frequency discriminator 38 is to detect momentary excursions (i.e. the FSK digital message) of the frequency of the incoming alarm transmitter signal, which excursions correspond to the digital code pattern sent by the alarm transmitter This digital signal is sent to code comparator 67.

The output of frequency discriminator 38 is, after initial frequency lock-up, a digital stream which corresponds with the digital stream transmitted by the companion alarm transmitter. Sync oscillator 59, which is synchronized with the 60 Hz AC power line frequency, generates a digital clock signal identical to that generated by sync oscillator 19 in the alarm transmitter, and this digital clock signal is sent to digital code generator 63 at a precise time initiated by a gate developed by summing simplifier 45, AND gate 64, flip flop 65 and gate 61. Code generator 63 generates a digital code pattern identical to, and in step with, the code generated by the alarm transmitter.

Thus the signal output from frequency discriminator 38 (i.e., the digital code stream $e_r$) should be identical to the digital code stream ec generated by the digital code generator 63, provided that the received signal is from a companion alarm transmitter which holds the same digital pattern as stored in the alarm receiver. Any signals from foreign alarm transmitters of like design but different digital code pattern will not have the same pattern and their outputs $e_c$ and $e_r$ will not match. When the pattern generated by digital code generator 63 is in correspondence with the digital pattern provided at the output of frequency discriminator 38 then the output of difference amplifier 67 will always be low because signal el will always be the same as signal $e_r$A sum signal (logic "1") will be developed in summing amplifier 45 in the presence of a signal in either the high frequency crystal filter 39 or the low frequency crystal filter 41. The output of summing amplifier 45 turns on Alarm flip flop 60 which establishes the appearance of an alarm condition. If the output of amplifier 67 remains low, then alarm flip-flop 69 will remain in the alarm condition (its output is logic "1") and this will signal an output alarm from gate 73 at the end of the first radio alarm transmission cycle because the output of amplifier 45 goes low, which makes inverter 71 go high, thus enabling alarm gate 73 that signals an alarm. On the other hand, if the output of digital code generator 63 does not match the output of the frequency discriminator 38 (e.g. a foreign signal), then a signal will be output from difference amplifier 67 which will reset alarm flip-flop 69 causing it to cancel its initial alarm condition, thus immediately voiding the alarm so that it is not detected.

The format of the alarm transmitter could be as in FIG. 4. A continuous wave (CW) preamble is first transmitted for a time sufficient to lock-up the receiver AFC and local oscillator circuits (e.g. about 0.5 seconds). The digital bit stream is then transmitted, for example, at 30 bits per second, or about 0.5 seconds for 16 bits. In the receiver the start pulse bit leading edge triggers start gate flip-flop 65 when a sufficiently strong signal is also present from amplifier 45, as determined by AND gate 84. The output from gate 65 starts code generator 63 and begins the code comparison between received code and stored code. This process is repeated as many times as the transmitter is designed to recycle. In the event of AC power line failure, AND gate 68 inhibits the reset pulse from code comparator 67 and therefore the CW preamble signal alone will cause an alarm; this is a back-up mode. Alternatively, switch 70 may be thrown to V+ and oscillators 19 and 59, and 1 to 51 will operate free running and still provide a limited operating capability.

The radio frequency oscillator stabilizing arrangement used in the transmitter (i.e. oscillator 1 synchronized to 60 Hz power line) may also be employed to stabilize the median frequency of local oscillator 51 in the receiver, and thus keep it within the frequency region between filters 39 and 41 without the need for precise median frequency control which might otherwise be required (e.g. a RF crystal). Also, for example, the intermediate receiver frequency might be selected to be 3.58 MHz so that low cost readily available television color burst carrier crystals may be used for filters 39 and 41. The AFC loop already described could still be used to fine tune local oscillator 51. Other arrangements are obviously possible in light of these basic teachings, for example, oscillator 19 could provide basic timing to cause an alarm test transmission at a periodic interval (e.g. once per hour) which is accurately known "a priori" by the receiver, thus providing a "supervised" system. Alternatively, one transmitter could "page" any one of many receivers, etc.

Thus while the preferred embodiment has been disclosed and described herein and some alternatives have been described, it will be obvious to those skilled in the art that various changes in form and detail may be made therein without departing from the spirit and scope thereof.

I claim:

1. A narrow band digital communication system comprising:

transmitting means at a first location for transmitting a radio signal which is frequency shifted according to a first digital code sequence and time referenced to the frequency of a power line; and receiving means at a second location for receiving said transmitted signal and deriving the first digital code sequence therefrom, said receiving means generating a second digital code sequence at a time referenced to the frequency of a power line, and comparing the first and second digital code sequences such that when the digital code sequences are identical, an output signal will be generated.

2. The communication system of claim 1 wherein the transmitting means comprises:

first detecting means for detecting a signal from the power line;

first digital code means coupled to said first detecting means for generating said first digital code sequence time referenced to said detected signal; and first signal means coupled to said digital code means for generating a radio signal which is frequency shifted by said first digital code sequence.

3. The communication system of claim 2 wherein said first detecting means includes an aerial means for detecting a signal from the power line.

4. The communication system of claim 1 wherein the receiving means comprises second means for detecting said first digital code sequence from the generated radio signals from said transmitting means;

third means for detecting the signal from the power line;

second digital code means coupled to said third means for generating said second digital code sequence time referenced to said power line and at the same rate as generated by said first digital code means;

difference detecting means for detecting the difference in the digital code sequences from said first digital code means and from second digital code means; and alarm generating means for generating an alarm when there is no difference in said digital code sequences and for not causing an alarm when there is a difference in said digital code sequences.

5. The communication system of claim 4 wherein the first and second digital code means include first and second synchronizing means respectively, responsive to the detected signals from said power line for generating a digital clocking frequency, such that said digital code sequences are generated at said digital clocking frequency from said synchronizing means.

6. The communication system of claim 2 wherein said transmitting means further comprises:

frequency divider means for dividing the radio frequency generated by said first signal means;

comparing means for comparing the divided radio frequency received from said frequency divider means with the frequency of the detected signal from the power line such that an error signal is generated corresponding to any difference in said signals;

synchronizing means for combining the error signal and said first digital code sequence and applying said combined signal to said first signal means such that said radio frequency is adjusted by the error signal and frequency shifted by the first digital code sequence prior to transmission.

7. The communication system of claim 1 wherein said transmitting means further comprises amplifying means for amplifying and multiplying the frequency shifted radio frequency prior to transmission.

8. The communication system of claim 1 wherein said receiving means further comprises automatic frequency control means for ensuring that the frequency of said second digital code sequence is the same as the frequency of said first digital code sequence.

9. A narrow band digital communication system for use in connection with signals generated by an existing AC power line comprising:

first means at a first location for detecting a signal from the power line;

second means at said first location for generating a first digital code sequence time referenced to as said detected signal;

third means at said first location for generating a radio signal which is frequency shifted by said first digital code sequence;

fourth means for detecting the generated radio signals from said third means at a second location;

frequency discrimination means at said second location for detecting the first digital code sequence from said detected generated radio signal;

fifth means at said second location for detecting a signal from the power line;

sixth means at said second location for generating a second digital code sequence at the same frequency as said signal detected by said fifth means from said power line;

seventh means at said second location for detecting the difference between the second digital code sequence from said second digital code generating means and the first digital code sequence detected by said frequency discriminating means; and means at said second location connected to said frequency discrimination means and said seventh means whereby a signal is generated when there is no difference in said first and second digital code sequences and an alarm is prevented when there is a difference in said digital code sequences.

10. The communication system of claim 9, further comprising:

frequency divider means at said first location for dividing the radio frequency generated by said radio signal generation means;

comparing means at said first location for comparing the divided radio frequency received from said frequency divider means with the frequency of the detected signal from the power line such that an error signal is generated corresponding to any difference in said signals;

synchronizing means at said first location for combining the error signal and said digital code sequence and applying said combined signal to said third means.

11. The communication system of claim 9 wherein said frequency discriminating means comprises:

first oscillator means for generating an output signal;

mixing means for mixing the detected transmitted signal from said fourth means and the output signal of said first oscillator means to provide a mixed signal;

phase splitting means for splitting said mixed signal into first and second signal;

high frequency filter means for receiving said first signal from said phase splitting means;

low frequency filter means for receiving said second signal from said phase splitting means; and automatic frequency control means for ensuring that the frequency received by said phase splitting means is at a frequency midway between the center frequency of high frequency filter means and low frequency filter means such that said first and second digital code sequences are at the same frequency.

12. The communication system of claim 9 wherein the first and second means for generating a digital code sequence comprise first and second synchronizing means responsive to the detected signal from said power line for generating a digital clocking frequency, such that said digital code sequences are generated at the clocking frequency from said synchronizing means.

13. The communication system of claim 9 wherein said first detecting means includes an aerial means for detecting a signal from the power line.

14. A narrow band digital transmitter utilizing signals generated by an existing AC power line, comprising:

(1) first means for detecting a signal from the power line;

(2) first synchronizing means responsive to the detected signal for generating a digital clocking frequency:

(3) first digital code generating means for developing a specific digital pulse sequence in accordance with a preselected code combination, said sequence being generated at the clocking frequency received from said synchronizing means;

(4) frequency oscillator means for generating a radio signal at a predetermined frequency;

(5) frequency amplifier means for multiplying and amplifying said radio signal from said frequency oscillator means;

(6) second means coupled to said frequency amplifier means for transmitting said amplified radio signal;

(7) frequency divider means for dividing the radio frequency received from said frequency oscillator means;

(8) comparing means for comparing the divided radio frequency received from said frequency divider means with the digital clocking frequency such that an error signal is generated corresponding to any difference in said signals;

(9) synchronizing means for combining the error signal and said digital code sequence and applying said combined signal to said frequency oscillator means;

whereby said radio frequency is synchronized with the digital clocking frequency such that the outgoing transmitted amplified radio signal is frequency shifted in accordance with the digital sequence generated by said digital code generating means.

15. A narrow band digital receiver using signals generated by a first existing AC power line and a transmitter utilizing signals generated at another location by a second AC power line comprising:

(1) voltage controlled first oscillator means for generating an output signal;

(2) third means for detecting the transmitted signals from said transmitter;

(3) mixing means for mixing the detected transmitted signal and the output of said first oscillator means to provide a mixed signal;

(4) frequency discrimination means for generating a control voltage which controls the output signal generated by said first oscillator means and for detecting a digital code sequence from said detected transmitted signal;

(5) fourth means for detecting a signal from the first power line;

(6) synchronizing means responsive to the signal detected from said power line for generating a digital clocking frequency;

(7) digital code generating means for generating a specific digital code sequence identical to and in sequence to said detected first digital code sequence;

(8) amplifying means for detecting the difference in the digital code sequence from said second digital code generating means and from said frequency discriminating means;

(9) output means responsive to said frequency discrimination means and said amplifying means for creating an output signal;

whereby when the digital code sequence from said frequency discrimination means and said digital code generating means are identical, an output signal will be generated, and when said sequences are different, said output means will not provide an output signal.

16. The receiver of claim 15 wherein said frequency discriminating means comprises:

phase splitting means for splitting said mixed signal, whereby a first and a second signal is generated;

high frequency filter means for receiving said first signal from said phase splitting means;

low frequency filter means for receiving said second signal from said phase splitting means; and frequency control ensuring that the signal received by said phase splitting means is midway between the center frequency of high frequency filter means and low frequency filter means.

17. A method of generating a narrow band digital alarm utilizing the frequency generated by existing AC power line, comprising the steps of:

detecting the frequency of the AC power line at a first location;

generating a first digital code sequence at the same frequency as the power line;

generating a radio frequency signal at said first location;

shifting the frequency of the radio frequency signal by the first digital code sequence generated at said first location and transmitting the frequency shifted radio signal;

detecting the transmitted frequency shifted signals at a second location;

detecting the first digital code sequence from said detected frequency shifted signal at a second location;

detecting the frequency of a power line at second location;

generating a second digital code sequence identical to and in sequence with said first digital code sequence at a second location;

detecting the difference between the detected first digital code sequence and in the second digital code sequence generated at the second location;

creating an alarm at the second location when there is no difference in said first and second digital code sequences, and voiding alarm when there is a difference in said first and second digital code sequences.

18. A digital communication system comprising:

radiating means at a first location for transmitting a radio signal having a digital signal modulated thereon, said digital signal being time referenced to the frequency of a power line; and receiving means at a second location for receiving said transmitted radio signal and deriving a digital signal therefrom, said receiving means having means time referenced to the frequency of a power line to detect said digital signal in synchronism with said transmitted digital signal.

19. The digital communication system of claim 18 wherein said transmitting and receiving means each have an aerial means for detecting the frequency of the power line.

* * * * *